（12） United States Patent
Aprotosoaie et al.

(10) Patent No.: US 9,239,836 B1
(45) Date of Patent: Jan. 19, 2016

(54) HIERARCHICAL MODELING FOR NETWORK SITES

(75) Inventors: Gheorghe Aprotosoaie, Chandler, AZ (US); Anna Catherine Bell, Seattle, WA (US); Jon N. Sorensen, Seattle, WA (US); Yifeng Zheng, Gilbert, AZ (US); Jeremy Boynes, Mercer Island, WA (US); Andrew S. Huntwork, Tempe, AZ (US); Donald J. Valdez, II, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1531 days.

(21) Appl. No.: 12/718,020

(22) Filed: Mar. 5, 2010

(51) Int. Cl.
*G06F 3/03* (2006.01)
*G06F 17/30* (2006.01)

(52) U.S. Cl.
CPC ...................................... *G06F 17/30* (2013.01)

(58) Field of Classification Search
CPC ........................................................ G06F 3/00
USPC ........... 715/234, 735, 736, 738, 853; 707/802
See application file for complete search history.

(56) References Cited

U.S. PATENT DOCUMENTS

| | | | |
|---|---|---|---|
| 6,026,433 A * | 2/2000 | D'Arlach et al. ............. | 709/217 |
| 6,684,369 B1 * | 1/2004 | Bernardo et al. ............. | 715/205 |
| 6,697,825 B1 * | 2/2004 | Underwood et al. ......... | 715/207 |
| 6,768,499 B2 * | 7/2004 | Miller et al. ................... | 715/723 |
| 6,931,591 B1 * | 8/2005 | Brown et al. ................. | 715/205 |
| 7,111,253 B2 * | 9/2006 | Newman ........................ | 715/854 |
| 7,120,879 B2 * | 10/2006 | Gutberlet et al. ............. | 715/853 |
| 7,167,903 B2 * | 1/2007 | Percival ......................... | 709/217 |
| 7,171,626 B2 * | 1/2007 | Sheldon et al. ............... | 715/810 |
| 7,171,629 B2 * | 1/2007 | Quimby ......................... | 715/854 |
| 7,366,108 B2 * | 4/2008 | Szentesi et al. ............... | 370/254 |
| 8,156,448 B2 * | 4/2012 | Niyogi et al. ................. | 715/854 |
| 2004/0148318 A1 * | 7/2004 | Taylor et al. .................. | 707/203 |
| 2006/0161880 A1 * | 7/2006 | Saad et al. ..................... | 717/104 |

* cited by examiner

*Primary Examiner* — Amy Ng
*Assistant Examiner* — Meseker Takele
(74) *Attorney, Agent, or Firm* — Thomas | Horstemeyer, LLP

(57) ABSTRACT

Disclosed are various embodiments for hierarchical modeling of network sites. A page model from a hierarchy of page models is provided in at least one computing device. The page model includes a plurality of features. Each one of the features is assigned to a respective network page region. The features include at least one original feature and at least one inheritable feature from a parent page model that is determined not to conflict with the at least one original feature. The features exclude at least one inheritable feature from the page model that is determined to conflict with the at least one original feature. A network page is generated in the at least one computing device corresponding to the page model. Each one of the features of the page model is encoded for rendering within the respective network page region.

29 Claims, 8 Drawing Sheets

500

HIERARCHICAL MODELING FOR NETWORK SITES

BACKGROUND

A network site may include any number of network pages, such as web pages. A network site for an online retailer may include, for example, one or more network pages for each category of items offered for order by the online retailer as well as other network pages. When a change that affects several categories is required, the administrator of the network site may be forced to edit a network page for each of the categories separately, even though the change is the same on each of the network pages.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Network sites may grow to include hundreds of pages, quickly becoming difficult to manage. For example, if each network page of a network site is stored separately as a hypertext markup language (HTML) file, making a change to the copyright notice included at the bottom of each of the network pages may be very time consuming to implement. The site administrator may have to open each file, locate the copyright notice code affected by the change in each file, and manually update the copyright notice code in each file.

The various embodiments disclosed herein relate to a network site employing a hierarchical model, such as a tree data structure comprising a plurality of nodes. A network page may be logically modeled as a node. In various embodiments, when a change is made to a root node of the tree, the change may propagate to the child nodes of the root node and their descendants, significantly reducing the user interaction necessary to implement the change.

Although the various embodiments herein are described in the context of a network site configured for an online retailer, it is understood that the principles disclosed herein may apply to any type of network site that could benefit from hierarchical modeling. In particular, an online retailer may organize items available for order into a taxonomy, thereby providing a starting point for a hierarchical arrangement of a network site. Thus, when a change is made to a home network page for a category of items such as, for example, books, the change may propagate to all network pages in the books category that inherit from the home network page.

Furthermore, the various embodiments described herein provide a rule-based system for enforcing restrictions of what features can or cannot be on a network page within the hierarchical model. By programmatically providing and enforcing restrictions, a network site designer may no longer have to contend with the time-consuming and error-prone procedure of determining which features are compatible every time a network page is created or modified. In the following discussion, a general description of the system and its components is provided, followed by a discussion of the operation of the same.

Figure 1:
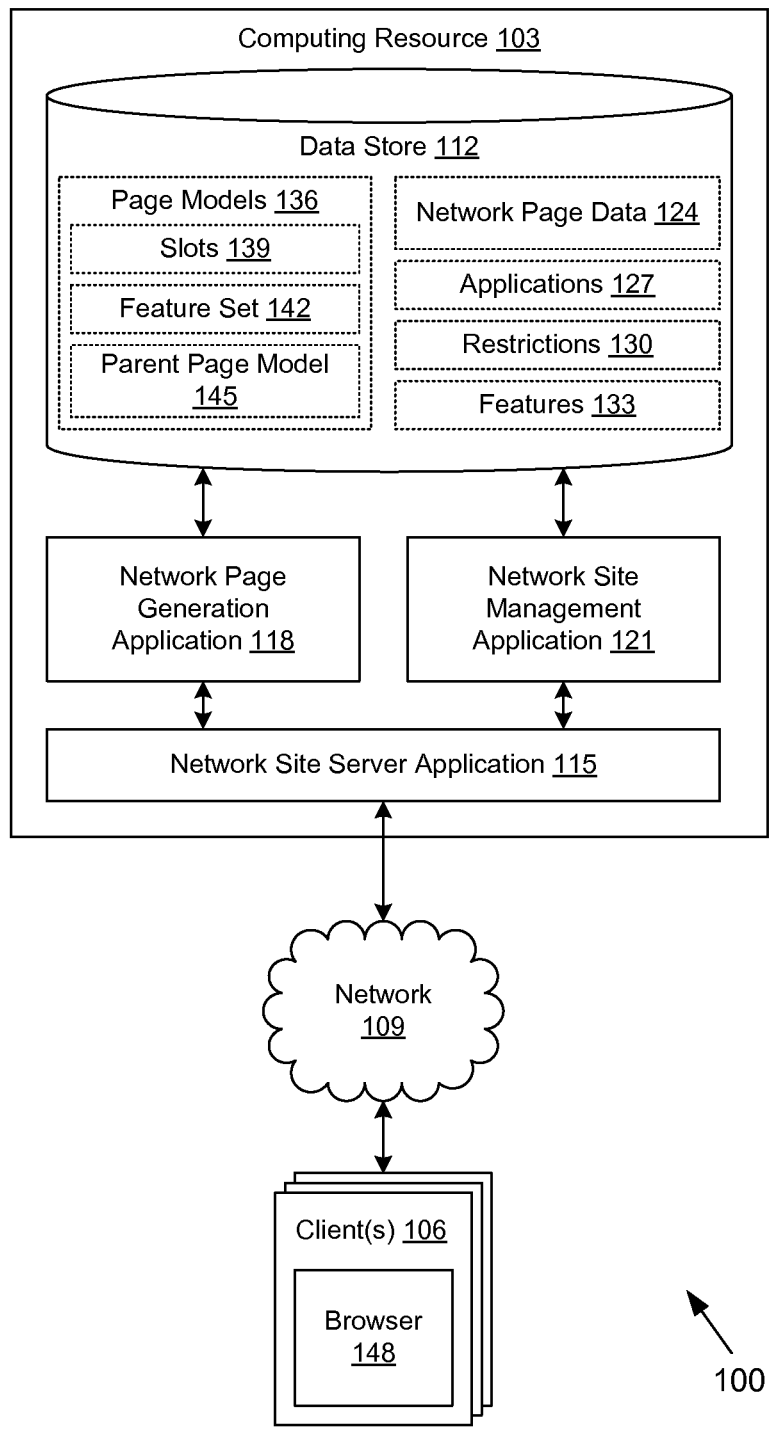
FIG. 1 is a drawing of a networked environment according to various embodiments of the present disclosure.

With reference to FIG. 1, shown is a networked environment 100 according to various embodiments. The networked environment 100 includes a computing resource 103 that is in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing resource 103 may comprise, for example, a server computer or any other computing device or system providing computing capability. The computing resource 103 may represent multiple computer systems arranged, for example, in one or more server banks or other arrangements. To this end, the computing resource 103 may comprise, for example, a cloud computing resource, a grid computing resource, and/or any other distributed computing arrangement. Such computer systems may be located in a single installation or may be dispersed among many different geographical locations. In one embodiment, the computing resource 103 represents a virtualized computer system executing on one or more physical computing systems. For purposes of convenience, the computing resource 103 is referred to herein in the singular. However, in one embodiment, the computing resource 103 represents a plurality of computer systems arranged as described above.

Various applications and/or other functionality may be executed in the computing resource 103 according to various embodiments. Also, various data is stored in a data store 112 that is accessible to the computing resource 103. The data store 112 may be representative of a plurality of data stores as can be appreciated. The data stored in the data store 112, for example, is associated with the operation of the various applications and/or functional entities described below.

The components executed on the computing resource 103, for example, include a network site server application 115, a network page generation application 118, a network site management application 121, and other applications, services, processes, systems, engines, or functionality not discussed in detail herein. The network site server application 115 is executed to receive network page requests from the client 106 over the network 109, and to serve up network pages in response to the network page requests. The network site server application 115 may comprise a web server application such as Apache HTTP Server, Microsoft® Internet Information Services (IIS), and/or any other type of network page server application.

The network page generation application 118 is executed in response to a network page request received by the network site server application 115 in order to generate a network page corresponding to the network page request. In one embodiment, the network page generation application 118 includes an interpreter for JavaServer Pages (JSP). The network site management application 121 is executed to receive network page requests from administrative users of the network site through the network site server application 115. The network site management application 121 may allow network site administrators to define new network pages and logical models of network pages, redefine existing network site characteristics, and/or control other aspects relating to a network site.

The data stored in the data store 112 includes, for example, network page data 124, applications 127, restrictions 130, features 133, page models 136, and potentially other data. The network page data 124 includes network pages and components thereof which are static or not otherwise generated by the network page generation application 118. Applications 127 define one or more functional applications that may be executed to provide dynamic content for use within a network page. As a non-limiting example, an application 127 may comprise Java Script code or other client-side code. As another non-limiting example, an application 127 may involve a communication with a server application in order to obtain some result.

Restrictions 130 define rules that specify which features 133 must be included within a network page or must be excluded from a network page. Features 133 define any type of feature that may be included within a network page, such as, for example, banners, advertisements, navigation bars, footers, headers, design elements, text, images, product descriptions, cascading style sheets, and/or any other element that may be encoded for rendering within a network page. In one embodiment, each feature 133 may be configured to specify or define its own restrictions 130. Such restrictions 130 may be defined in a declarative manner by data included in the feature 133.

Page models 136 define a plurality of logical page models that may be translated into network pages by the network page generation application 118. A page model 136 comprises the base unit, or node, of the hierarchical network site model. In one embodiment, the page model 136 is an extensible markup language (XML) document. In another embodiment, the page model 130 is a JavaScript Object Notation (JSON) document or other type of document.

Each page model 136 may include, for example, one or more slots 139, a feature set 142, a link to a parent page model 145, and/or other elements. Each of the slots 139 corresponds to a display region of the network page that is generated based on the particular page model 136. To this end, a network page may be said to be divisible into one or more slots 139, each one corresponding to a network page region. The feature set 142 includes one or more features 133 that are assigned to one or more slots 139. The feature set 142 may also include one or more applications 127 that may be translated into features 133. The parent page model 145 defines a link to another page model 136 that is a parent for a particular page model 136. When a page model 136 is a root page model 136, as non-limiting examples, the parent page model 145 may comprise a null value or may be empty. In various embodiments, page models 136 may also include links to child page models 136 and other page models 136 as desired.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

The client 106 may be configured to execute various applications such as a browser 148 and/or other applications. The browser 148 may be executed in a client 106, for example, to access and render network pages, such as web pages, or other network content served up by the computing resource 103 and/or other servers. The client 106 may be configured to execute applications beyond browser 148 such as, for example, email applications, instant message applications, and/or other applications.

Figure 2:
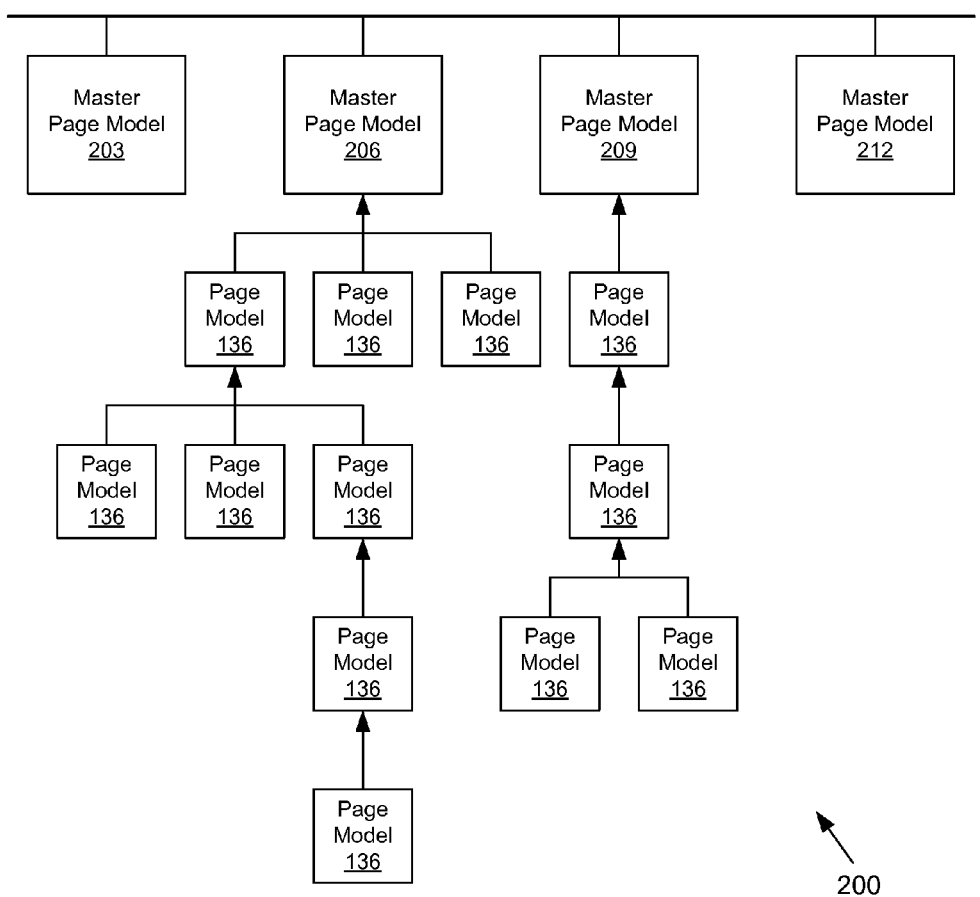
FIG. 2 is a drawing of one example of a hierarchical network page model according to various embodiments of the present disclosure.

Referring next to FIG. 2, a hierarchical network site model 200 is shown. The hierarchical network site model 200 includes a plurality of master page models 203, 206, 209, 212 and a plurality of page models 136. Each of the master page models 203, 206, 209, 212 represents page models 136 that have no parent page model 145 (FIG. 1). As depicted in FIG. 2, the master page models 203, 212 have no children, while the master page models 206, 209 do have children. The page models 136 shown in FIG. 2 each have a parent page model 145 corresponding to the respective master page model 206, 209 or page model 136.

Each of the page models 136 and master page models 203, 206, 209, 212 includes a respective feature set 142 (FIG. 1). For the child page models 136, the feature set 142 comprises at least one original feature 133 (FIG. 1) and at least one inheritable feature 133 from the respective parent page model 145 that is determined not to conflict with the at least one original feature 133. In other words, the feature set 142 excludes at least one inheritable feature 133 from the parent page model 145 that is determined to conflict with the at least one original feature 133. As can be seen in FIG. 2, there may be multiple levels of inheritance regarding inheritable features 133.

Although not depicted in FIG. 2, any of the page models 136 or master page models 203, 206, 209, 212 may include hyperlinks to one or more network pages of the network site that are not included within the model. Such network pages may comprise, for example, network pages for individual items or products offered for order. In addition, multiple page models 136 or master page models 203, 206, 209, 212 may link to a single network page.

Referring back to FIG. 1, a general description of the operation of the various components of the networked environment 100 is provided. A user at a client 106 requests a network page over the network 109 from the network site server application 115. The network site server application 115 passes the network page request to the network page generation application 118 when the network page request corresponds to a page model 136. In various embodiments, a page model 136 may be identified by a uniform resource locator (URL) or other parameter submitted in the request.

Thereafter, the network page generation application 118 obtains data to generate a network page from the data store 112. To this end, the network page generation application 118 retrieves the corresponding page model 136. When a parent page model 145 is provided in the page model 136, the network page generation application 118 retrieves a next page model 136 corresponding to the parent page model 145. This is repeated for any number of ancestor page models 136. The features 133 in the feature sets 142 of the ancestor page models 136 propagate away from the root node through the hierarchical network site model 200 (FIG. 2) where they do not conflict with features 133 and the feature set 142 at a child page model 136 in the tree.

In various embodiments, the feature set 142 of a leaf node (i.e., a node having no children) may have a greater priority than a feature set 142 of any ancestor of the leaf node. As a non-limiting example, when a first page model 136 assigns a first feature 133 of the feature set 142 to a certain slot 139, a second feature 133 introduced as an original feature 133 in a second page model 136 that is a child of the first page model 136 will override the first feature 133 of the first page model 136 when assigned to the same slot 139 or when otherwise conflicting with the first feature 133. In the present disclosure, a feature 133 is considered an "original" feature 133 within a given feature set 142 when the feature 133 is not inherited from an ancestor page model 136. In various embodiments, only the inheritable features 133 that are not conflicting with original features 133 may be passed onto child page models 136.

The network page generation application 118 then generates a network page from the page model 136 by translating the page model 136 for example, into HTML code and/or other types of network page code that may be rendered by a browser 148. Such a process may be characterized as generating a view for the page model 136 and/or generating a view for each respective feature 133. In the model-view-controller paradigm of software engineering, a view is said to render the model into a form that is suitable for user interaction. To this end, various features 133 may comprise code that may be incorporated directly within the network page, while other features 133 may be translated from some other type of code. Further, any application 127 included in the feature set 142 may be executed to produce a corresponding feature 133, which is thereby included in the generated network page.

Ultimately, each feature 133 in the feature set 142 is included in its assigned slot 139, which corresponds to a display region within the generated network page. In one embodiment, each slot 139 corresponds to an HTML table data cell. In another embodiment, each slot 139 corresponds to a SPAN or DIV HTML element. The generated network page is provided to the network site server application 115, which in turn, sends the generated network page over the network 109 to the client 106 for rendering in the browser 148.

The network site served up by the computing resource 103 may also be administered by way of the network site management application 121. The network site management application 121 may be configured to provide a user interface through which an administrative user may create new page models 136 and/or modify existing page models 136. As a non-limiting example, an administrative user of the network site at a client 106 may send a request to the network site server application 115 to administer the network site. This request is then passed to the network site management application 121. Authentication of the administrative user may be performed by either the network site server application 115 or the network site management application 121.

As a non-limiting example, the administrative user may desire to add a new page model 136 as a child page model 136 of some other existing page model 136. A user interface may be provided to the administrative user within a network page that graphically resembles the parent page model 136. The user interface may provide a means for selecting one or more slots 139 of the page model 136 for modification. For example, a region boundary may be traced out with a border, making a slot 139 user selectable with a single click, double click, right click, etc. within the browser 148. In the user interface, the administrative user may delete a feature 133 from the parent page model 136 or replace a feature 133 from the parent page model 136. If a feature 133 is replaced from a parent page model 136, an original feature 133 added in its place within a child page model 136 will have a greater priority, thereby effecting displacement of the feature 133 from the respective slot 139 of the parent page model 136. Therefore, the conflicting feature 133 that has been replaced is not inherited by the feature set 142 of the child page model 136. However, other features 133 not modified or otherwise configured when creating the child page model 136 will be automatically included, or inherited, from the parent page model 136. A user may also be given the option of subdividing or deleting existing slots 139 or otherwise reconfiguring slots 139 for a child page model 136.

As another non-limiting example, the administrative user may desire to add a new user-specified original feature 133 to an existing page model 133. Such a new feature 133 may be assigned to an empty slot 139 or may displace one or more other features 133 that would conflict. Such a displacement may be carried out automatically by the network site management application 121 in response to the add feature 133 request, may be carried out automatically by the network page generation application 118 when a network page request for the particular page model 136 is received, or may be carried out manually through the user requesting that the other feature(s) 133 be deleted. In addition, original features 133 of a page model 136 may be associated with differing priorities, which may allow for automatic handling of conflicts among original features 133.

In some embodiments, multiple features 133 may be assigned, or at least tentatively assigned, to a single slot 139. However, two or more features 133 are determined to conflict when they cannot be encoded for rendering within the same slot 139. As a non-limiting example, two or more features 133 may be determined to conflict if they would overlap or otherwise occupy the same display region in the browser 148. As another non-limiting example, two or more features 133 may be determined to conflict or be incompatible if a restriction 130 exists that prevents their assignment to a single slot 139. Moreover, in various embodiments, a feature 133 in a slot 139 may prevent another feature 133 from being encoded for rendering in another slot 139.

The network site management application 121 may enforce one or more restrictions 130 that are applicable to a request to create a child page model 136 or modify an existing page model 136. As a non-limiting example, the child page model 136 may be required to have a certain feature 133 within the feature set 142. Thus, the network site management application 121 may prevent a user from deleting a certain feature 133 that is required to be within the child page model 136. Alternatively, or additionally, a restriction 130 may provide for an original feature 133 to be included within the child page model 136 based on certain criteria, such as other features 133 or applications 127 that have been added. Moreover, the restrictions 130 may prevent the user from adding a certain feature 133 to the child page model 136.

The network site management application 121 may be configured to generate an error when a request does not comply with the rules embodied in restrictions 130. In one embodiment, the network site management application 121 may be configured to obtain user input when a request to add or modify a feature 133 does not comply with a restriction 130. The user input may specify how to resolve a conflict with a restriction 130 or an existing original or inherited feature 133. As a non-limiting example, a user may specify that a newly added feature 133 is to override other features 133 or restrictions 130 of the page model 136.

Restrictions 130 may specify a variety of rules to be evaluated governing the inclusion of features 133 within page models 136. Several additional examples of restrictions 130 are presented herein but are not intended to be limiting. A restriction 130 may specify that a particular feature 133 has a fixed assignment within a slot 139 and cannot be moved. For example, a feature 133 providing a network site banner may be given a fixed assignment to a slot 139 at the top of a network page. A restriction 130 may specify whether a particular feature 133 can be included more than once within a page model 136 and/or a slot 139. For example, a copyright notice feature 133 may be restricted to one appearance within a network page, while a certain advertising feature 133 may be included several times within a network page. A restriction 130 may define that a feature 133 is required for one or more page models 136. For example, the copyright notice feature 133 may be required to be in all network pages.

Restrictions 130 may define which features 133 are compatible or incompatible with one another. For example, a search engine feature 133 may be compatible with a shopping cart feature 133 but incompatible with an order pipeline feature 133. Restrictions 130 may also define which features 133 are compatible or incompatible with particular page models 136. For example, a search engine feature 133 may be compatible with a shopping cart page model 136 but incompatible with an order payment page model 136. Furthermore, restrictions 130 may define that a feature 133 is compatible or incompatible with a network site (i.e., a collection of one or more page models 136). For example, a merchandising feature 133 applicable to merchandising fresh produce may be compatible with a network site selling fruit baskets but incompatible with a network site devoted to setting automotive parts.

A restriction 130 may also indicate that a page model 136 is automatically to include one or more original features 133 when the page model 136 is created. Such restrictions 130 may further specify specific slots 139 for automatic placement. For example, a restriction 130 may indicate that every page model 136 for a network site is to include a copyright notice feature 133 at a slot 139 located at the bottom of the network page. Restrictions 130 may also govern whether a feature set 142 of a page model 136 may be modified, whether the feature set 142 is limited to a certain number of features 133, etc. Additionally, restrictions 130 may include other rules affecting placement of features 133 within a page model 136.

Figure 3:
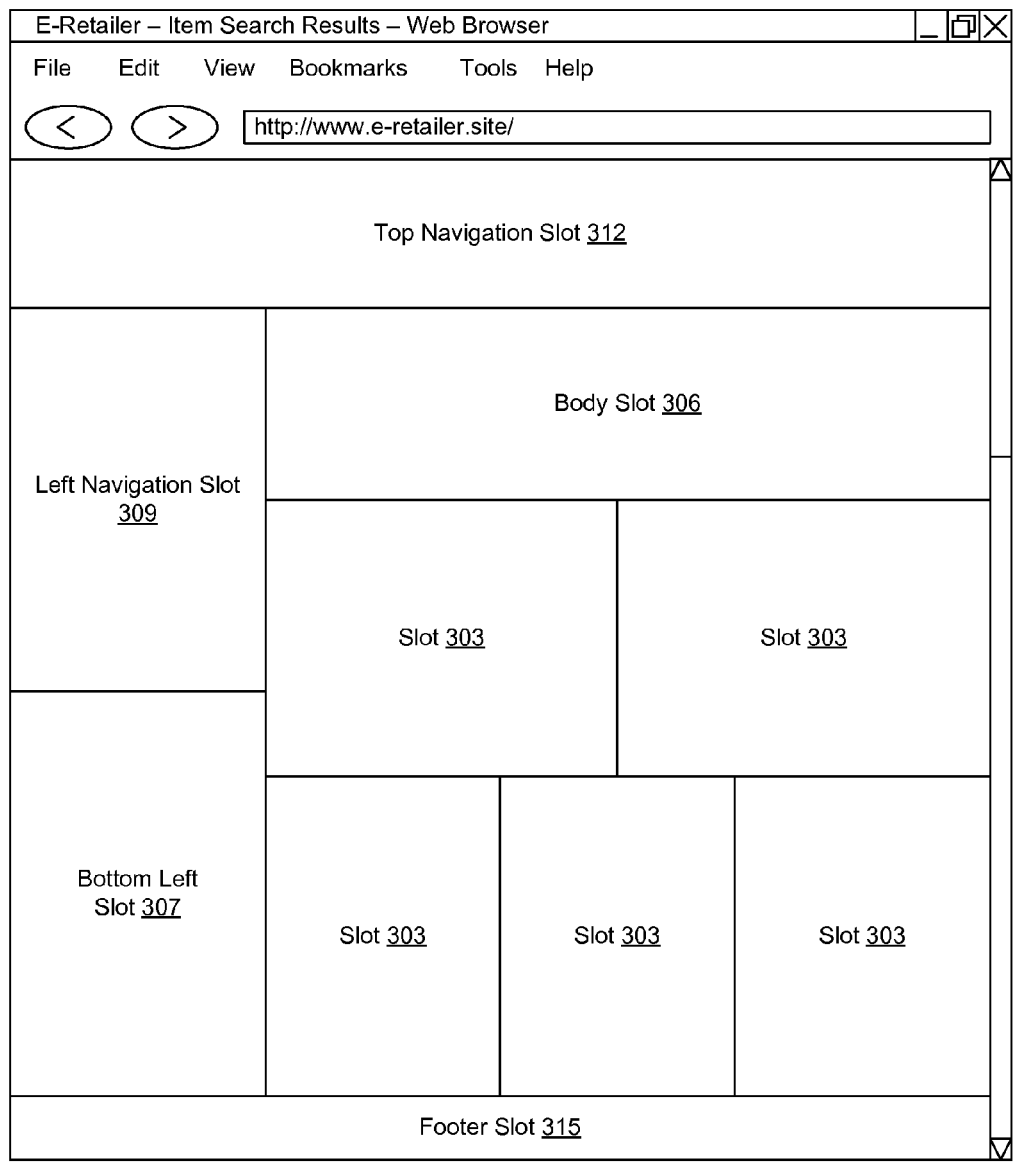
FIGS. 3-5 are drawings of examples of user interfaces rendered by a client in the networked environment of FIG. 1 according to various embodiments of the present disclosure.

Referring next to FIG. 3, shown is one example of a user interface rendered by browser 148 (FIG. 1) executing in a client 106 (FIG. 1) in the networked environment 100 (FIG. 1) according to various embodiments of the present disclosure. In particular, FIG. 3 depicts a network page layout 300 shown within a browser 148. The network page layout 300 is divided into a plurality of slots 303, including a body slot 306, a bottom left slot 307, a left navigation slot 309, a top navigation slot 312, and a footer slot 315. In one embodiment, the network page layout 300 comprises at least one table in HTML. In another embodiment, the network page layout 300 comprises logical divisions in HTML and/or XML, for example, by using DIV elements and CSS. In various embodiments, at least some of the slots 303 may be aligned relative to one another in rows and/or columns.

The network page layout 300 is merely one example of how a network page may be divided into a number of slots 303 corresponding to display regions. The network site management application 121 (FIG. 1) may permit an administrative user to select from any number of preconfigured network page layouts 300 in order to create a new page model 136 (FIG. 1). Furthermore, although the slots 303 of the network page layout 300 are indicated with a certain size relative to the display area of the browser 148, it is understood that the slots 303 may be fixed in size or may change in size based on other attributes (e.g., glue elements, constraints, etc.) and/or what features 133 (FIG. 1) are assigned to each slot 303. For example, when no features 133 are assigned to a particular slot 303, that slot 303 may collapse in area and occupy no display region of the browser 148. However, in another embodiment, the particular slot 303 may comprise a display region having a fixed or proportional size while including no features 133.

Figure 4:

Moving on to FIG. 4, shown is another example of a user interface rendered by a browser 148 (FIG. 1) executing in a client 106 (FIG. 1) in the networked environment 100 (FIG. 1) according to various embodiments of the present disclosure. In particular, FIG. 4 depicts one example of a network page 400 corresponding to a root page model 136 (FIG. 1) using the network page layout 300 of FIG. 3.

The network page 400 includes a banner and links within the top navigation slot 312 and links and copyright information within the footer slot 315. Within the left navigation slot 309, the network page 400 includes a list of links that corresponds to categories of the network site. Each of these links may correspond to master page models 203, 206, 209, 212 (FIG. 2) in various embodiments. Bottom left slot 307 includes a sale advertisement. Body slot 306 includes promotional matter related to merchandise offered for order through the network site. As shown in the network page 400, body slot 306 has expanded to fill the space provided for the other slots 303 below the body slot 306 in FIG. 3.

Figure 5:
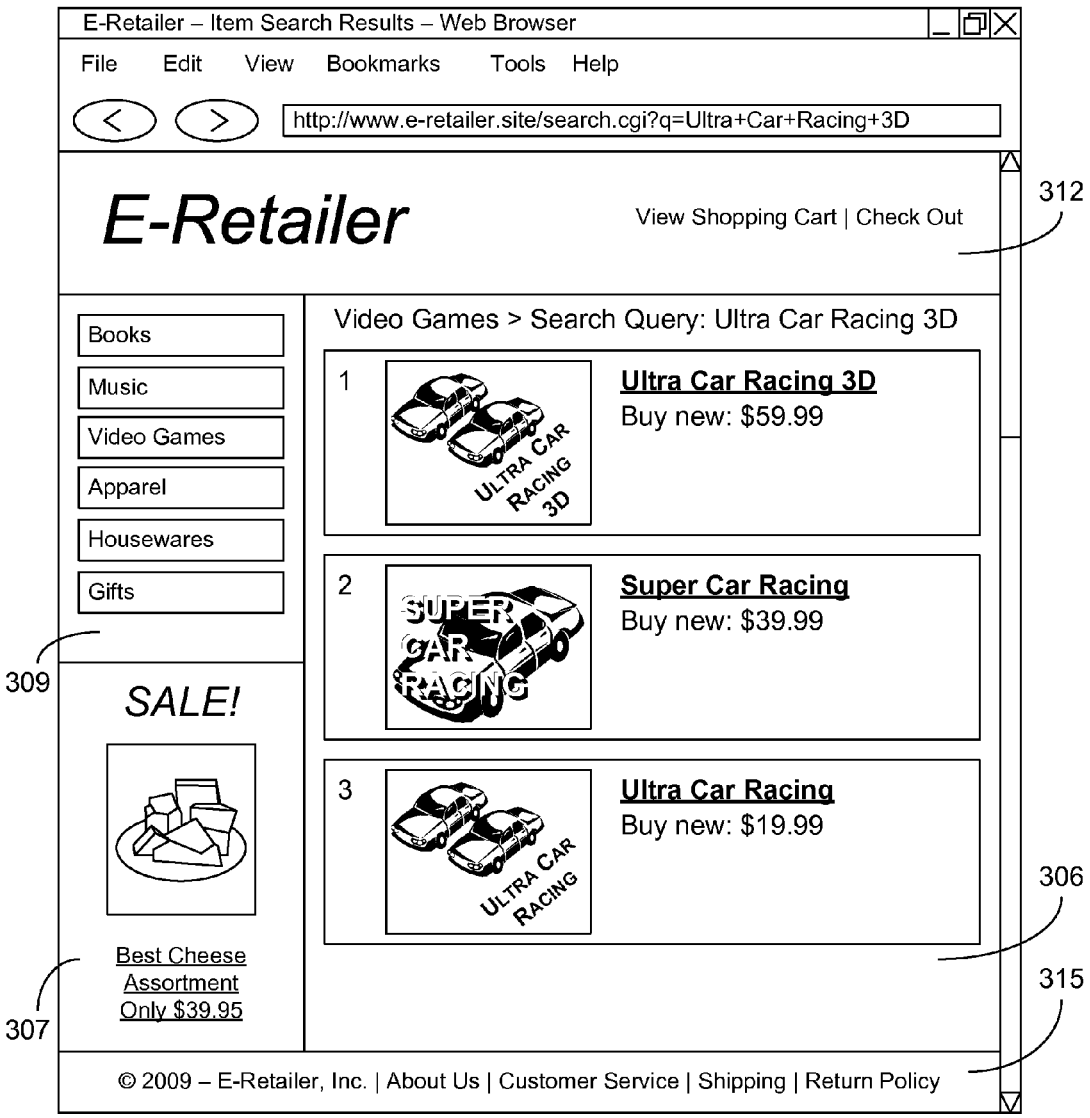

Turning now to FIG. 5, shown is another example of a user interface rendered by a browser 148 (FIG. 1) executing in a client 106 (FIG. 1) in the networked environment 100 (FIG. 1) according to various embodiments of the present disclosure. In particular, shown is a network page 500 corresponding to a child page model 136 (FIG. 1) of the root page model 136 associated with the network page 400 (FIG. 4). Compared with the network page 400, the contents of bottom left slot 307, left navigation slot 309, top navigation slot 312, and footer slot 315 are identical. It may be said that the child page model 136 has inherited the respective features 133 (FIG. 1). However, the content formerly presented in body slot 306 in FIG. 4 has been replaced with new content relating to an item search query. Such content as shown in body slot 306 may be generated, for example, by a search application 127 (FIG. 1).

The priority assigned to the feature 133 corresponding to the search application 127 is a greater priority than that assigned to the content shown in body slot 306 in network page 400. Therefore, the child page model 136 from which network page 500 was generated does not inherit the content from the root page model 136 of network page 400.

Figure 6:
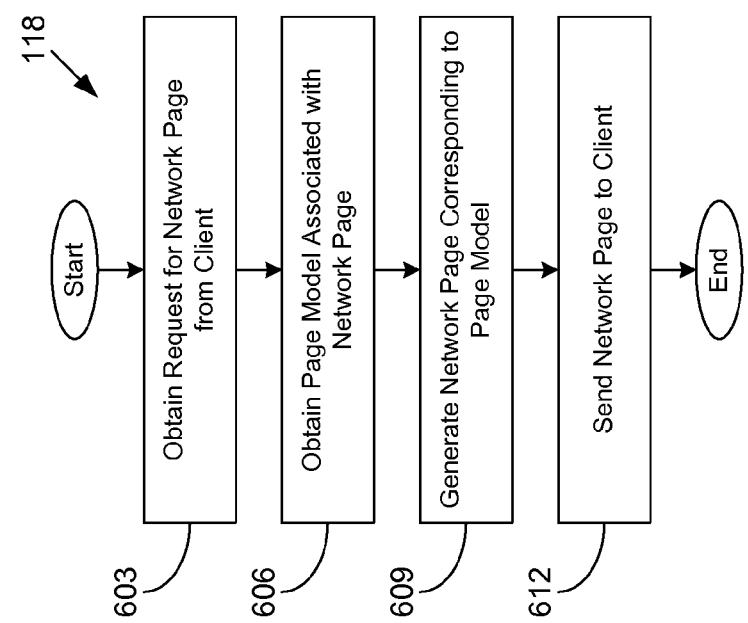

Referring next to FIG. 6, shown is a flowchart that provides one example of the operation of a portion of the network page generation application 118 according to various embodiments. It is understood that the flowchart of FIG. 6 provides merely an example of the many different types of functional arrangements that may be employed to implement the operation of the portion of the network page generation application 118 as described herein. As an alternative, the flowchart of FIG. 6 may be viewed as depicting an example of steps of a method implemented in the computing resource 103 (FIG. 1) according to one or more embodiments.

Beginning with box 603, the network page generation application 118 obtains a request for a network page from a client 106 (FIG. 1) over the network 109 (FIG. 1). Next, in box 606, the network page generation application 118 obtains a page model 136 (FIG. 1) associated with the network page indicated in the network page request.

Figure 7:
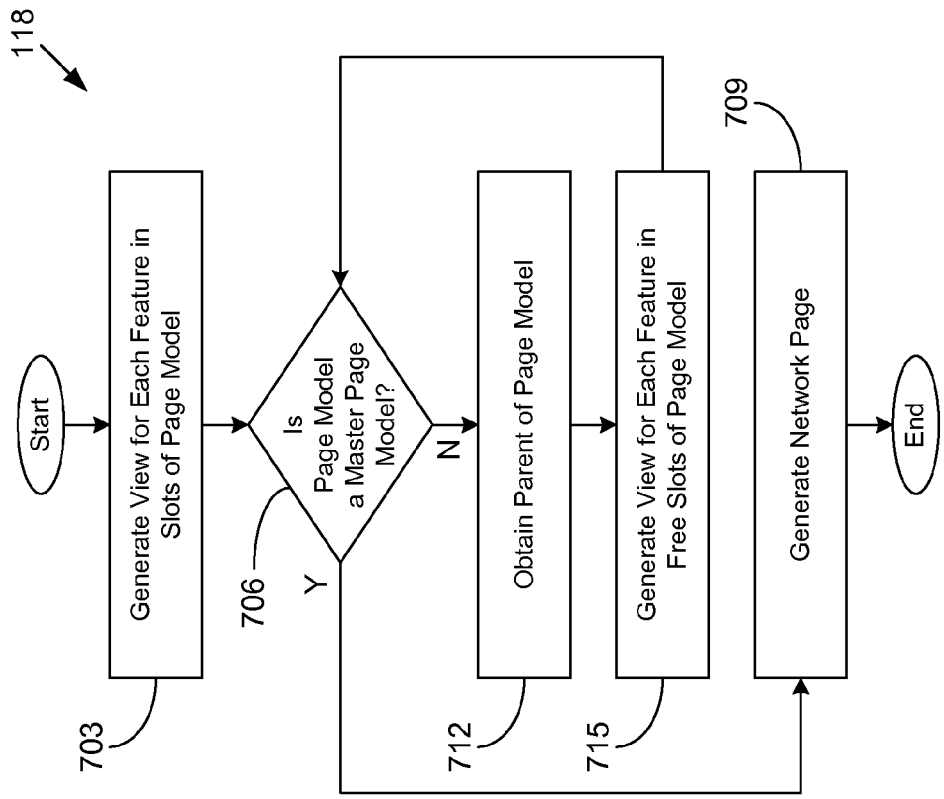
FIGS. 6 and 7 are flowcharts illustrating examples of functionality implemented as portions of a network page generation application executed in a computing resource in the networked environment of FIG. 1 according to various embodiments of the present disclosure.

Then, in box 609, the network page generation application 118 generates a network page corresponding to the page model 136. To this end, the network page generation application 118 translates each of the features 133 (FIG. 1) or applications 127 (FIG. 1) indicated by the feature set 142 (FIG. 1) into code that may be rendered within a display region indicated by the respective slot 139 (FIG. 1). Further, the network page generation application 118 may obtain features 133 inherited from the respective parent page model 145 (FIG. 1) associated with the page model 136 that has been requested. More details of such a task are shown by the flowchart of FIG. 7. Next, in box 612, the network page generation application 118 sends the generated network page to the client 106. Thereafter, the network page generation application 118 ends.

Turning now to FIG. 7, shown is a flowchart that provides an example of the operation of another portion of the network page generation application 118 according to various embodiments. It is understood that the flowchart of FIG. 7 provides merely an example of the many different types of functional arrangements that may be described herein. As an alternative, the flowchart of FIG. 7 may be viewed as depicting an example of steps of a method implemented in the computing resource 103 (FIG. 1) according to one or more embodiments.

Beginning with box 703, the network page generation application 118 generates a view corresponding to each feature 133 (FIG. 1) in the slots 139 (FIG. 1) of the page model 136 (FIG. 1). Next, in box 706, the network page generation application 118 determines whether the page model 136 requested is a master page model 136.

If, in box 706, the network page generation application 118 determines that the page model 136 is a master page model 136, the network page generation application 118 proceeds to box 709 and generates the network page. Thereafter, the network page generation application 118 ends.

If, in box 706, the network page generation application 118 determines instead that the page model 136 is not a master page model 136, the network page generation application 118 proceeds to box 712 and obtains the parent page model 145 (FIG. 1) of the page model 136. Next, in box 715, the network page generation application 118 generates a view for each feature 133 assigned to free slots 139 of the page model 136. In other words, a slot 139 is a free slot 139 when no other feature 133 from a child page model 136 in the hierarchy has been assigned to that slot 139. Thereafter, the network page generation application 118 returns back to box 706 and repeats the task indicated for box 706 for the parent page model 145. Thus, the control flow repeats until a master page model 136 has been processed.

Figure 8:
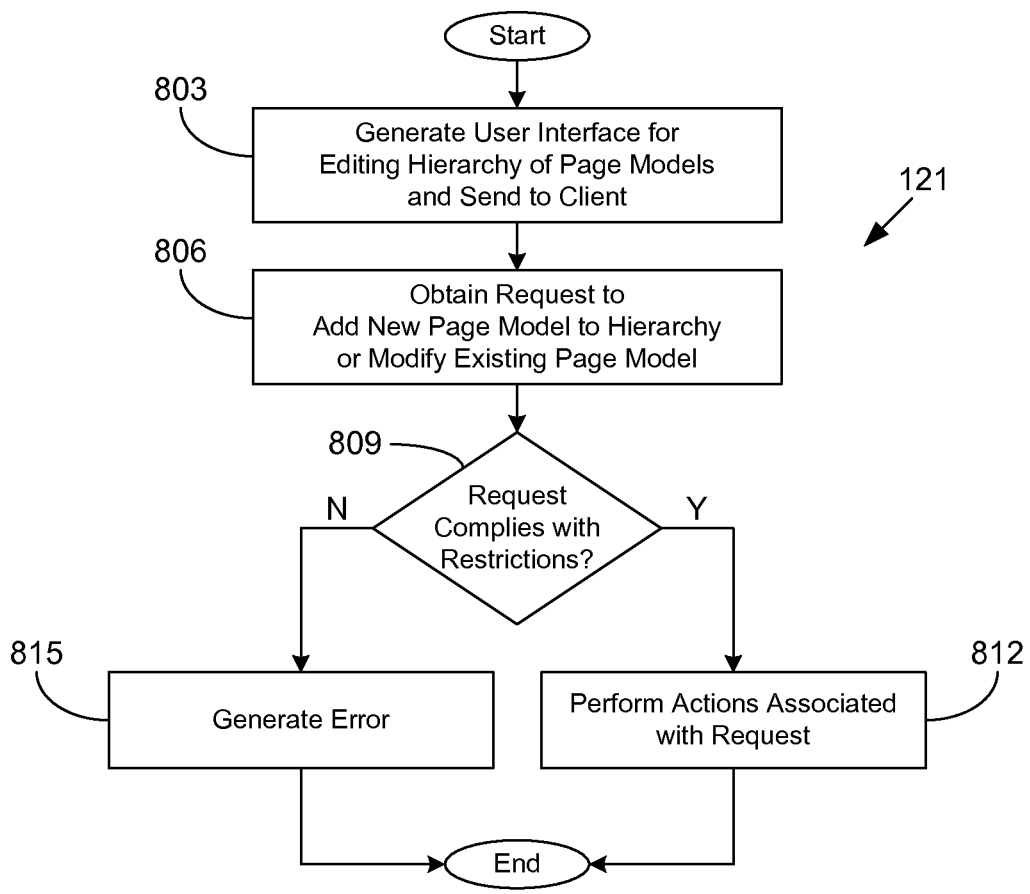
FIG. 8 is a flowchart illustrating an example of functionality implemented as a portion of a network site management application executed in a computing resource in the networked environment of FIG. 1 according to various embodiments of the present disclosure.

Referring next to FIG. 8, shown is a flowchart that provides an example of the operation of a portion of the network site management application 121 according to various embodiments. It is understood that the flowchart of FIG. 8 provides merely an example of the many different types of functional arrangements that may be described herein. As an alternative, the flowchart of FIG. 8 may be viewed as depicting an example of steps of a method implemented in the computing resource 103 (FIG. 1) according to one or more embodiments.

Beginning with box 803, the network site management application 121 generates one or more user interfaces for editing a hierarchy of page models 136 (FIG. 1) and sends the user interface(s) to a client 106 (FIG. 1). As non-limiting examples, the user interface(s) may comprise network pages that provide a programmatic or "what you see is what you get" (WYSIWYG) interface for editing logical page models 136 that are translated into network pages. The user interfaces may provide for adding, modifying, moving, deleting, and/or otherwise editing page models 136. The user interface may provide for a separate window to select a layout for the page model 136 to divide it into a plurality of slots 139 (FIG. 1). As a non-limiting example, a user may edit the feature set 142 (FIG. 1) associated with a page model 136, including which features 133 (FIG. 1) are assigned to which slots 139.

Next, in box 806, the network site management application 121 obtains a request to add a new page model 136 to the hierarchy or modify an existing page model 136 from the client 106. In box 809, the network site management application 121 determines whether the request complies with one or more restrictions 130 (FIG. 1). In other words, the network site management application 121 evaluates whether the page model 136, features 133 of the page model 136, network site associated with the page model 136, and/or other elements embodied in the request comply with one or more rules of the one or more restrictions 130.

If, in box 809, the network site management application 121 determines that the request does comply with the restrictions 130, the network site management application 121 proceeds to box 812 and performs one or more actions associated with the request. That is, the network site management application 121 may add a new page model 136 to the hierarchy of page models 136 or modify an existing page model 136 in accordance with the request. In various embodiments, when the request relates to updating a feature 133 of a page model 136 that is inherited by descendant page models 136 of the page model 136, the network site management application 121 may be configured to propagate the update to the descendant page models 136 automatically in accordance with the updated feature 133. Thereafter, the network site management application 121 ends.

If, in box 809, the network site management application 121 determines instead that the request does not comply with the restrictions 130, the network site management application 121 moves to box 815 and generates an error. The error may be generated in the form, for example, of a network page and sent to the client 106. Thereafter, the network site management application 121 ends.

Figure 9:
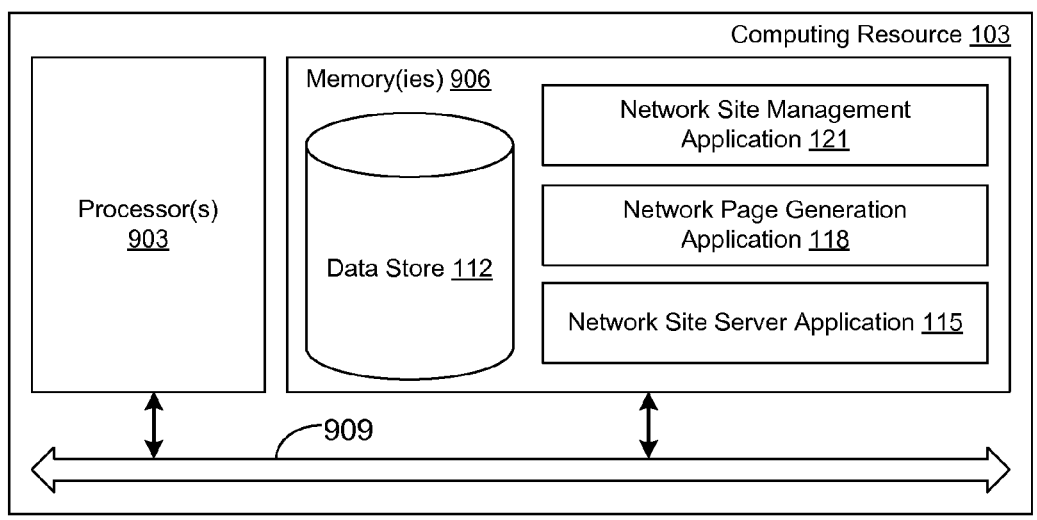
FIG. 9 is a schematic block diagram that provides one example illustration of a computing resource employed in the networked environment of FIG. 1 according to various embodiments of the present disclosure.

With reference to FIG. 9, shown is a schematic block diagram of the computing resource 103 according to an embodiment of the present disclosure. The computing resource 103 includes at least one processor circuit, for example, having a processor 903 and a memory 906, both of which are coupled to a local interface 909. To this end, the computing resource 103 may comprise, for example, at least one server computer or like device. The local interface 909 may comprise, for example, a data bus with an accompanying address/control bus or other bus structure as can be appreciated.

Stored in the memory 906 are both data and several components that are executable by the processor 903. In particular, stored in the memory 906 and executable by the processor 903 are the network site management application 121, the network page generation application 118, the network site server application 115, and potentially other applications. Also stored in the memory 906 may be a data store 112 and other data. In addition, an operating system may be stored in the memory 906 and executable by the processor 903.

It is understood that there may be other applications that are stored in the memory 906 and are executable by the processors 903 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 906 and are executable by the processor 903. In this respect, the term "executable" means a program file that is in a form that can ultimately be run by the processor 903. Examples of executable programs may be, for example, a compiled program that can be translated into machine code in a format that can be loaded into a random access portion of the memory 906 and run by the processor 903, source code that may be expressed in proper format such as object code that is capable of being loaded into a random access portion of the memory 906 and executed by the processor 903, or source code that may be interpreted by another executable program to generate instructions in a random access portion of the memory 906 to be executed by the processor 903, etc. An executable program may be stored in any portion or component of the memory 906 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 906 is defined herein as including both volatile and nonvolatile memory and data storage components. Volatile components are those that do not retain data values upon loss of power. Nonvolatile components are those that retain data upon a loss of power. Thus, the memory 906 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 903 may represent multiple processors 903 and the memory 906 may represent multiple memories 906 that operate in parallel processing circuits, respectively. In such a case, the local interface 909 may be an appropriate network 109 (FIG. 1) that facilitates communication between any two of the multiple processors 903, between any processor 903 and any of the memories 906, or between any two of the memories 906, etc. The local interface 909 may comprise additional systems designed to coordinate this communication, including, for example, performing load balancing. The processor 903 may be of electrical or of some other available construction.

Although the network site management application 121, the network page generation application 118, the network site server application 115, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 6-8 show the functionality and operation of an implementation of portions of the network page generation application 118 and the network site management application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 903 in a computer system or other system. The machine code may be converted from the source code, etc. If embodied in hardware, each block may represent a circuit or a number of interconnected circuits to implement the specified logical function(s).

Although the flowcharts of FIGS. 6-8 show a specific order of execution, it is understood that the order of execution may differ from that which is depicted. For example, the order of execution of two or more blocks may be scrambled relative to the order shown. Also, two or more blocks shown in succession in FIGS. 6-8 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including network site management application 121, the network page generation application 118, and the network site server application 115, that comprises software or code can be embodied in any computer-readable medium for use by or in connection with an instruction execution system such as, for example, a processor 903 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, the program having instructions that when executed cause the at least one computing device to perform a method comprising:
   providing, by the at least one computing device, a page model from a hierarchy of page models, the page model including a plurality of features, each one of the features being assigned to a respective network page region, the features including at least one original feature and at least one inherited feature from a parent page model;
   associating, by the at least one computing device, a respective priority with each feature of the page model, the at least one original feature being associated with a greater priority than the at least one inherited feature;
   encoding, by the at least one computing device, for rendering within the respective network page region each one of the features of the page model that does not conflict with another one of the features of the page model;
   encoding, by the at least one computing device, for rendering within a shared network page region a feature being associated with a greatest priority out of a plurality of conflicting features assigned to the shared network page region; and
   generating, by the at least one computing device, a network page corresponding to the page model according to the network page regions encoded for rendering, the network page being generated in response to a network page request obtained from a client computing device.

2. The non-transitory computer-readable medium of claim 1, wherein the method further comprises:
   obtaining, by the at least one computing device, a request to create a child page model of the page model in the hierarchy from a client computing device; and
   creating, by the at least one computing device, the child page model in response to the request, the child page model automatically including the features of page model.

3. The non-transitory computer-readable medium of claim 1, wherein the method further comprises:
   obtaining, by the at least one computing device, a request to add an original feature to the page model from an administrative client computing device; and
   replacing, by the at least one computing device, the at least one inherited feature of the page model with the original feature when the at least one inherited feature conflicts with the original feature.

4. The non-transitory computer-readable medium of claim 1,
   wherein the method further comprises evaluating, in the at least one computing device, at least one restriction to determine whether the at least one original feature and the at least one inheritable feature conflict.

5. The non-transitory computer-readable medium of claim 4, wherein at least one of the features includes data that defines the at least one restriction.

6. The non-transitory computer-readable medium of claim 1, wherein the method further comprises obtaining, in the at least one computing device, a request to add a child page model of the page model to the hierarchy, the child page model inheriting at least one feature of the page model.

7. The non-transitory computer-readable medium of claim 6, wherein the method further comprises adding, in the at least one computing device, at least one mandatory original feature to the child page model upon creation of the child page model, the at least one mandatory original feature being specified as required for the child page model.

8. A method, comprising:
   providing, in at least one computing device, a page model from a hierarchy of page models, the page model including a plurality of features, each one of the features being assigned to a respective network page region, the features comprising at least one original feature and at least one inheritable feature from a parent page model that is determined not to conflict with the at least one original feature, the features excluding at least one inheritable feature from the parent page model that is determined to conflict with the at least one original feature;
   determining, in the at least one computing device, that the at least one original feature and an inheritable feature from the parent page model conflict when the at least one original feature and the inheritable feature are tentatively assigned to a same network page region and the at least one original feature and the inheritable feature cannot be encoded for rendering within the same network page region; and
   generating, in the at least one computing device, a network page corresponding to the page model, each one of the features of the page model being encoded for rendering within the respective network page region.

9. The method of claim 8, wherein the page model is defined at least in part by extensible markup language (XML).

10. The method of claim 8, wherein a plurality of instances of a single feature may be included in the page model.

11. The method of claim 8, further comprising evaluating, in the at least one computing device, at least one restriction to determine whether the at least one original feature and the inheritable feature from the parent page model conflict.

12. The method of claim 8, further comprising:
   obtaining, in the at least one computing device, a request to update a feature of the parent page model that is inherited by the page model, the request being obtained from a client computing device; and
   updating, in the at least one computing device, the parent page model and the page model in response to the request.

13. The method of claim 8, further comprising obtaining, in the at least one computing device, a request to add a child page model of the page model to the hierarchy, the child page model inheriting at least one feature of the page model.

14. The method of claim 13, further comprising adding, in the at least one computing device, at least one mandatory original feature to the child page model upon creation of the child page model, the at least one mandatory original feature being specified as required for the child page model.

15. The method of claim 8, further comprising:
   obtaining, in the at least one computing device, a request to add an original feature to the page model from a client computing device; and
   replacing, in the at least one computing device, an inherited feature of the page model with the original feature when the inherited feature conflicts with the original feature.

16. The method of claim 8, further comprising:
- obtaining, in the at least one computing device, a request to add an original feature to a network page region of the page model from a client computing device;
- determining, in the at least one computing device, that the original feature is compatible with the network page region and the page model based at least in part on at least one restriction; and
- adding, in the at least one computing device, the original feature to the page model in response to determining that the original feature is compatible with the network page region and the page model.

17. The method of claim 8, further comprising:
- obtaining, in the at least one computing device, a request to remove the at least one original feature from the page model, the request being obtained from a client computing device; and
- replacing, in the at least one computing device, the at least one original feature with an inherited feature from the parent page model.

18. A system, comprising:
- at least one computing device configured to perform a method comprising:
  - obtaining, by the at least one computing device, a request to add a page model to a hierarchy of page models, the page model including a plurality of features, each one of the features being assigned to a respective network page region, the features including at least one original feature and all inheritable features from a parent page model that are determined not to conflict with the at least one original feature, the features excluding any inheritable feature from the parent page model that is determined to conflict with the at least one original feature;
  - determining, by the at least one computing device, that the request to add the page model to the hierarchy of page models complies with at least one restriction;
  - adding, by the at least one computing device, the page model to the hierarchy when the request to add the page model to the hierarchy of page models complies with the at least one restriction;
  - obtaining, by the at least one computing device, a request to update a feature of the parent page model that is inherited by the page model; and
  - updating, by the at least one computing device, the parent page model and the page model in response to the request to update the feature.

19. The system of claim 18, wherein at least one of the features includes data that defines the at least one restriction.

20. The system of claim 18, wherein determining that the request complies with the at least one restriction further comprises evaluating, by the at least one computing device, the at least one restriction to determine whether a first one of the features conflicts with a second one of the features.

21. The system of claim 18, wherein the method further comprises generating, by the at least one computing device, an error when the request does not comply with the at least one restriction.

22. The system of claim 18, wherein the method further comprises obtaining, by the at least one computing device, user input when the request does not comply with the at least one restriction.

23. The system of claim 18, wherein the method further comprises:
- obtaining, by the at least one computing device, a request to add another original feature to the page model; and
- evaluating, by the at least one computing device, at least one restriction to determine whether the another original feature conflicts with one of the features.

24. The system of claim 18, wherein the method further comprises:
- obtaining, by the at least one computing device, a request to modify one of the features of the page model; and
- determining, by the at least one computing device, that the request to modify complies with at least one restriction.

25. The system of claim 18, wherein the method further comprises including, by the at least one computing device, at least one original feature in the page model based at least in part on at least one restriction.

26. The system of claim 18, wherein the request specifies at least one user-specified original feature for the page model.

27. The system of claim 18, wherein the method further comprises generating, by the at least one computing device, a user interface configured to provide a means for selecting at least one of a plurality of network page regions for modification.

28. The system of claim 18, wherein the method further comprises:
- associating, by the at least one computing device, a respective priority with each feature of the page model, the at least one original feature being associated with a greater priority than the features of the parent page model; and
- encoding, by the at least one computing device, for rendering within a shared network page region a feature being associated with a greatest priority out of a plurality of conflicting features assigned to the shared network page region.

29. The system of claim 18, the method further comprising encoding, by the at least one computing device, for rendering each one of the features of the page model within the respective network page region.

* * * * *